United States Patent [19]

Treiber

[11] 4,161,633

[45] Jul. 17, 1979

[54] SUBSCRIBER LINE/TRUNK CIRCUIT

[75] Inventor: Robert Treiber, Centerport, N.Y.

[73] Assignee: International Telephone & Telegraph Corp., Nutley, N.J.

[21] Appl. No.: 903,458

[22] Filed: May 8, 1978

Related U.S. Application Data

[63] Continuation of Ser. No. 773,713, Mar. 2, 1977, abandoned.

[51] Int. Cl.² ........................ H04B 3/20; H04M 9/08
[52] U.S. Cl. ............................ 179/170.2; 179/18 AF; 325/42
[58] Field of Search .................. 179/15 BL, 1 F, 1 P, 179/2 DP, 18 AF, 170.2, 170.6; 325/42, 52; 235/152, 156; 333/18; 340/15.5 DP

[56] References Cited

U.S. PATENT DOCUMENTS

| | | | |
|---|---|---|---|
| 3,651,316 | 3/1972 | Gibson | 325/42 |
| 3,949,206 | 4/1976 | Edwards et al. | 325/42 |
| 3,983,381 | 9/1976 | Jones, Jr. | 235/152 |
| 4,032,762 | 6/1977 | Caloyannides | 235/152 |

*Primary Examiner*—Thomas A. Robinson

*Attorney, Agent, or Firm*—John T. O'Halloran; Jeffrey P. Morris

[57] ABSTRACT

A microprocessor controlled subscriber line circuit for interfacing analog telephone lines and trunks to a digital switching system is disclosed. All processing of incoming analog signals is accomplished by the line circuit, including the interface between the line and a digital switching matrix, measuring, monitoring, testing of the signals associated with the speech path. Additionally, the dc signal powering the carbon microphone on the handset is generated as well as ringing and other tones. Equalization and providing the two-wire to four-wire conversion with acceptable echo performance and minimized cross-office transmission loss are also accomplished. Analog-to-digital and digital-to-analog conversions are accomplished under microprocessor control as are the tone and power generation functions in a programmable power supply configuration utilizing pulse duration modulated feedback control in a programmable signal generator. The described subscriber circuit is particularly advantageous in that it is designed to maximize its implementation using solid state circuit techniques including large scale integration as opposed to conventional components and relays.

37 Claims, 4 Drawing Figures

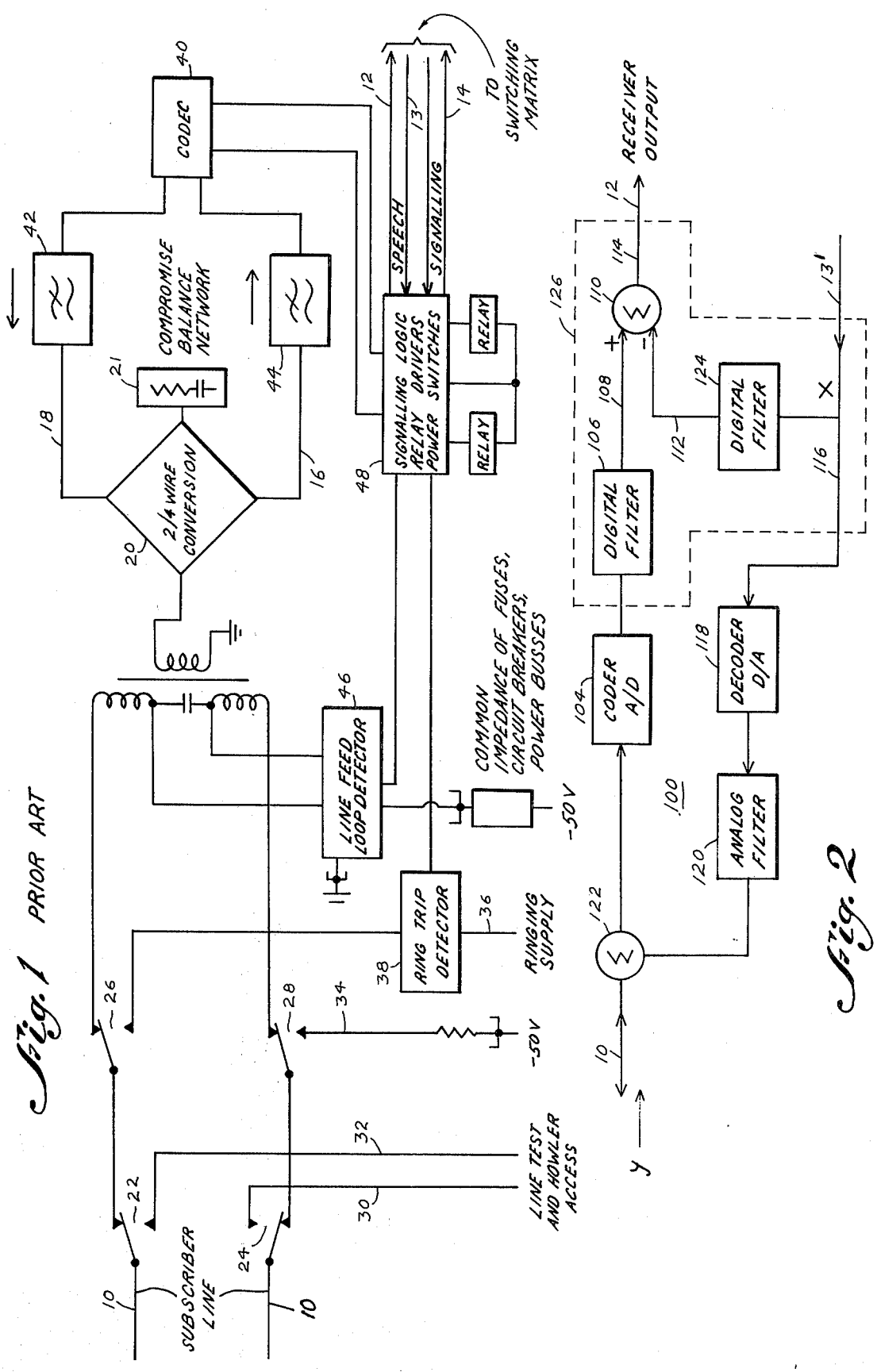

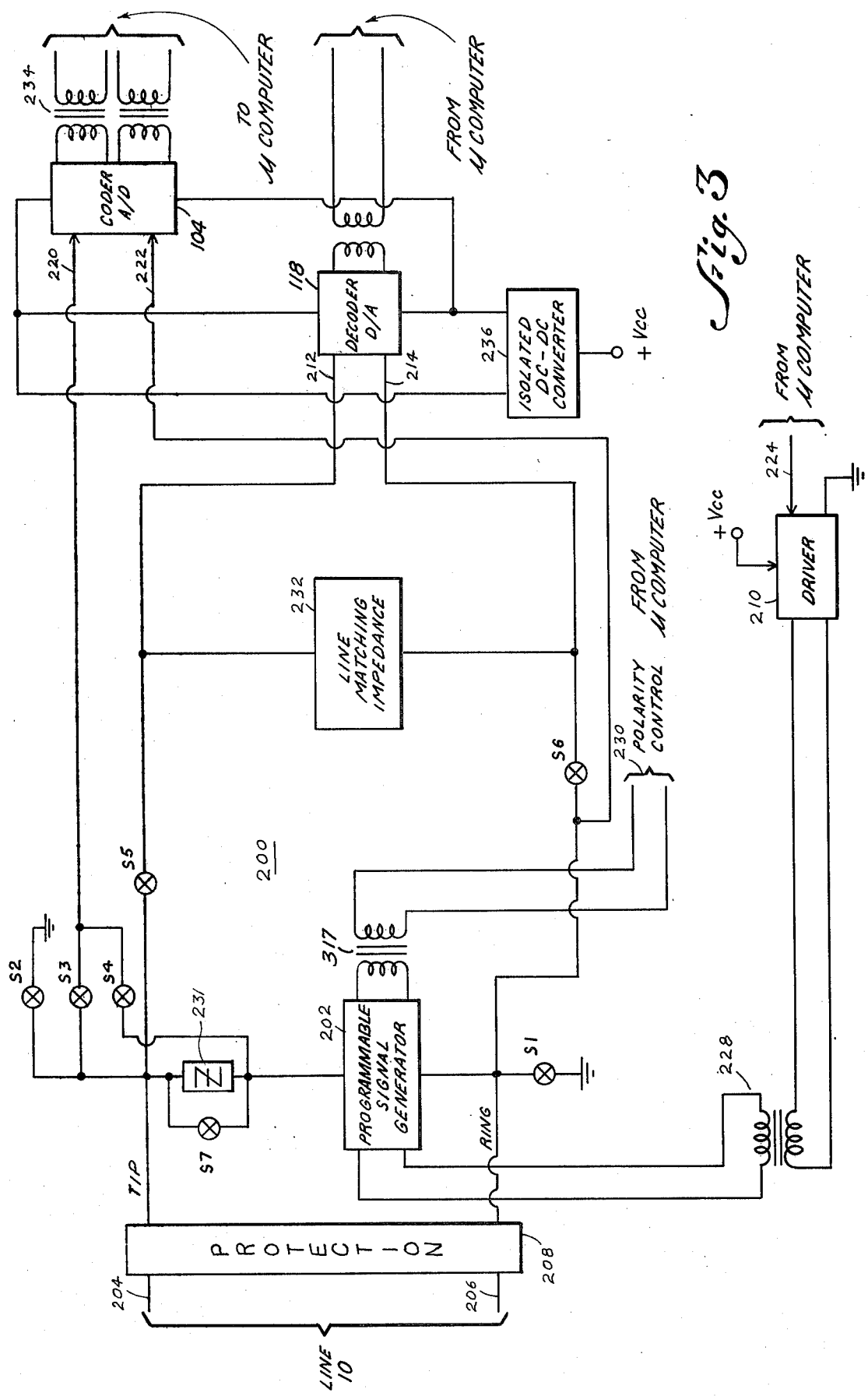

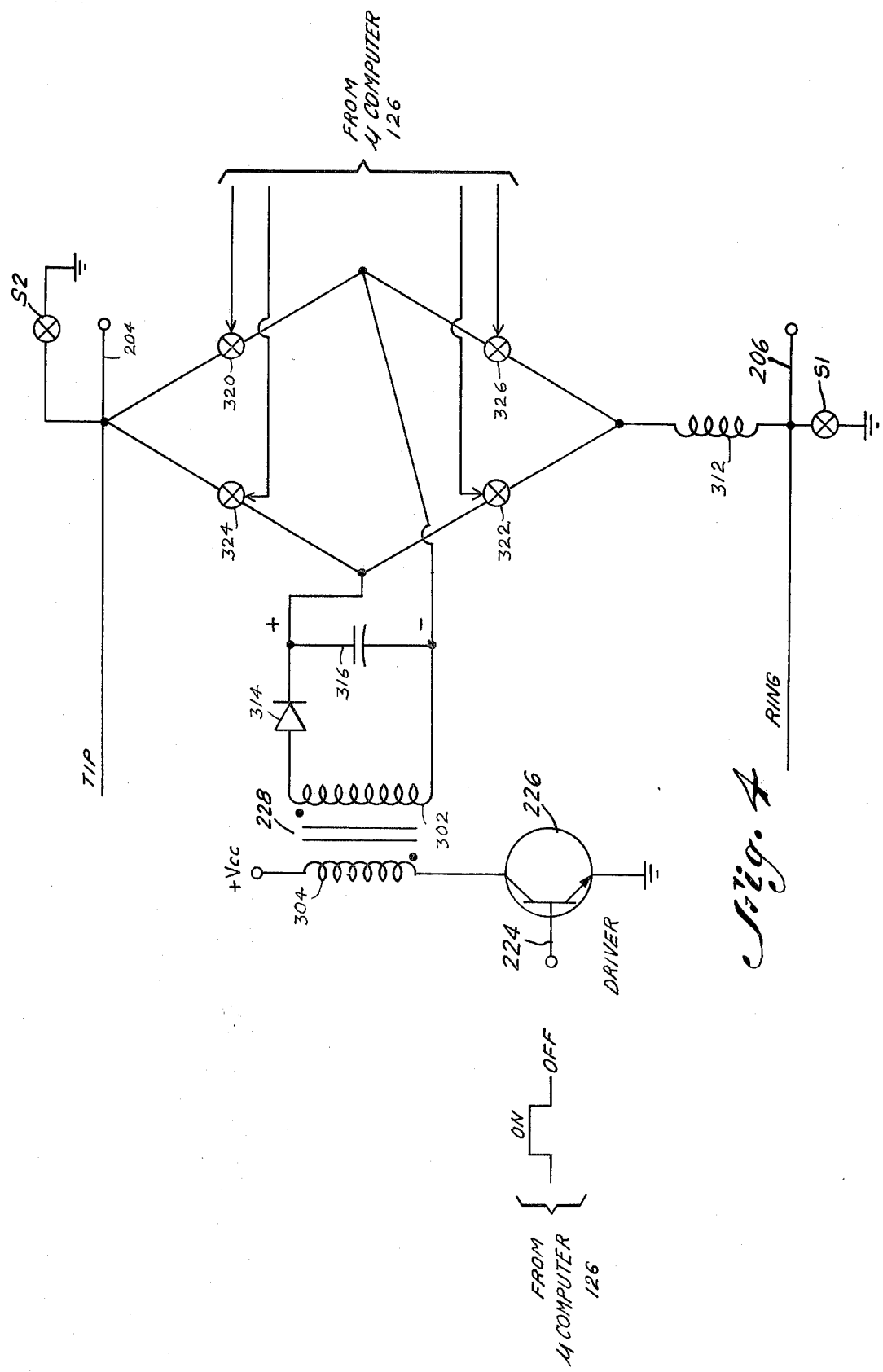

SUBSCRIBER LINE/TRUNK CIRCUIT

This is a continuation of application Ser. No. 773,713, filed Mar. 2, 1977, now abandoned.

BACKGROUND OF THE INVENTION

1. Field of the Invention

The present invention relates to subscriber line/trunk circuits in general, and to an improved analog subscriber line/trunk circuit wherein a microcomputer controlled line circuit for each line or group of lines in a multiple subscriber system compensates for differing transmission characteristics from line to line without the signal distortions or including complex and costly measurement and monitoring equipment of the prior art. All functions are accomplished by the present subscriber circuit, without signal degradation, by utilizing a microcomputer per line or one microcomputer for a plurality of lines to perform the foregoing and associated digital filtering for the subscriber circuit of the present invention.

2. Description of the Prior Art

In the prior art, the problem of differing impedance and transmission characteristics of multiple line types has been approached by balancing the line impedance between the subscriber set and the switching network by insertion of components on a per line basis to achieve a "compromise" characteristic. From a loss viewpoint, this resulted in a degradation of the analog line signal of two decibels in the transmission direction and two decibels in the receiving direction. Further, if this problem is avoided by individually balancing each line, testing must be accomplished at each line, which is both expensive and time consuming. In accordance with one aspect of the present system, the line balancing for each line is accomplished by means of an automatic computation in a data processor, such as a microcomputer, by sending a tone on the line, measuring the tone upon its return and storing data for use in the system. In accordance with another aspect of the present invention, digital filters are used to compensate for attenuation with frequency and reduce the magnitude of unwanted return signals to an acceptable level. Heretofore, subscriber circuits have utilized two-wire switching, which does not require two-wire to four-wire conversion circuits, thus no undesired signal return is generated. In contrast, the padding by subtraction technique of the present invention achieves the foregoing programmably using digital filters to compensate for variation in transmission parameters. Also, in accordance with the present invention, bulky components, such as audio transformers and electro mechanical relays are eliminated. Digital filters per se are well known in the prior art. A description of the general design of such filters may be found in: *Digital Processing of Signals*, B. Gold and C. Rader, Lincoln Laboratory Publication, Mc Graw-Hill, 1969.

SUMMARY OF THE INVENTION

A line circuit interface incorporating a programmable power supply for interfacing the analog subscriber lines and trunks of a telephone system to the digital switching circuitry of a telephone exchange central office or to other digital circuitry is described wherein all A/D and D/A conversion, two-wire to four-wire conversion, ringing voltage and other tone generation, measuring, testing and line monitoring are done by the subscriber circuit, thereby enabling a more efficient central office operation. Continuous feedback under microcomputer control for a programmable signal generator is provided to derive a pulse duration modulated control signal in response to monitored load changes on the subscriber tip and ring lines. Also, in the same manner, ring trip and off-hook detection is accomplished without the need for external sensing devices. Current sensitive equalization equipment is effectively moved from the telephone subset to the central office. Except during programmable measuring and testing, the subscriber circuit may be isolated and floating with respect to dc ground, which substantially eliminates the common power supply crosstalk problem of the prior art. Speech signal isolation is achieved under microcomputer control by digitally filtering the unwanted signal returns from the speech path. The dc signal powering the microphone on the handset is generated such that there is no common audio impedance.

It is therefore a primary object of the present invention to provide an improved subscriber line/trunk circuit incorporating digital filtering techniques for a digitally switched local/central office of a telephone system.

It is another primary object of the present invention to provide apparatus and method for implementing, under programmable control at the subscriber circuit, a plurality of measuring, testing, monitoring, equalization and tone generation functions.

Other objects and advantages of the present invention will become apparent with reference to the accompanying drawings and detailed description thereof, wherein:

BRIEF DESCRIPTION OF THE DRAWINGS

FIG. 1 is a line circuit of the prior art illustrative of a typical interface between a subscriber telephone set and a digital local exchange.

FIG. 2 is a block diagram showing the implementation of the two-wire to four-wire conversion using digital filtering techniques internal to the microcomputer.

FIG. 3 is a block and circuit diagram illustrative of greater detail of the line circuit excluding the microcomputer system.

FIG. 4 is a schematic diagram of the programmable signal generator described with reference to FIG. 3, showing the programmable signal generator and driver circuits.

DESCRIPTION OF THE PREFERRED EMBODIMENT

Referring now to FIG. 1, a typical subscriber line circuit of the prior art is illustrated for providing an interface between the analog telephone lines and the digital portions of a local exchange, such as the switching matrix thereof. The incoming analog signal on a two-wire analog line 10 from a typical subscriber telephone set is converted to a four-wire PCM encoded signal for connection to a digital local switching matrix via speech lines 12 and signalling lines 14. Return speech signals are received on line 13. Input signals on line 16 from converter 20 and output signals on line 18 from filter 42 are isolated from each other by a two-wire to four-wire converter circuit 20, a circuit which does not compensate for the imperfect impedance match at the two-wire line interface. A compromise balance circuit 21, typically 900 ohms and two microfarads in series, is used to attempt to balance the wide variation in two-wire line impedances. Due to its less than perfect action some of the signal 16 is transmitted back on line 18. In a typical connection between two line circuits, their signals can cause an instability or near-singing condition resulting in poor perceived transmission by the subscriber. The prior art seeks to resolve this problem by inserting an extra 2 db of loss in the four-wire path. (16,18). This problem is avoided by one aspect of the present invention by more nearly matching the equivalent balance impedance to that of the line on an individual basis automatically. Switches 22, 24, 26, 28 and others provide for switching in dc voltage for tip and ring signals, test signals, dc power supply and other line monitoring signals, such as test signals via lines 30 and 32, a voltage for powering the carbon microphone or other dc voltage via line feed loop detector 46, and a ringing supply via line 36 to a ring trip detector 38 and return dc via line 34. These switches, detectors, connections and lines when multiplied by the number of telephone subscriber sets in a typical telephone system are expensive and, in fact, the subscriber line circuits typically represent as much as eighty percent of the equipment cost of telephone exchanges; hence, simplification thereof represents a substantial cost saving. All of the aforementioned switches, test lines, detectors, and the two-wire to four-wire converter 20 are eliminated in accordance with the present invention. A coder-decoder (codec) 40 may perform the analog-to-digital and digital-to-analog conversion. One such technique first encodes the analog signal into digital format using linear A/D conversion techniques. The resultant digital signal is then companded. Analog filtering is provided by filters 42 and 44 which are expensive bulky audio components. A line feed loop detector 46 provides the dc voltage for powering the microphone on the handset to the line and supplies a sensing signal to signalling logic, relay drivers and power switches 48, which serves to couple the digital output of the codec 40 to the speech line 12 and the various signal tones to the signalling lines 14.

Referring now to FIG. 2, a subscriber line circuit 100 for providing an interface between a two-wire analog line 10 and a digital system such as a digital switching matrix is illustrated generally at 100. A telephone subscriber y communicates with another telephone subscriber x by coupling analog signals representative of speech over the two-wire line 10 in the forward direction, indicated by the arrow (which for simplicity of description is shown as a single communications path as are all of the other communications paths in FIG. 2) to the line circuit 100, which converts these analog signals into digital signals which are coupled out of the line circuit by line 12 to a switching matrix (not shown). After switching by the switching matrix, these digital signals are coupled to another telephone subscriber line circuit, which is of the same configuration as the illustrated line circuit 100. Digitally coded return communications from such other telephone subscriber line circuit, after switching by the digital switching matrix, are coupled to line circuit 100 on the digital return line 13', (with the return direction from the other subscriber line circuit being indicated by the arrow adjacent x). This digital return signal is converted to an analog return signal by line circuit 100 and coupled to subscriber y over the two wire analog line 10 to enable two way communication between subscribers x and y.

The two-wire analog line 10 is converted in the line circuit 100 into a four-wire line to split the two directions of communication into separate forward and return two-wire paths. This is required as is well known in the art so that the communication signals in the forward and return directions can be operated upon by and can be compatible with unidirectional devices such as analog-to-digital coders and digital-to-analog decoders. A problem associated with two to four-wire converters of the prior art is that under varying transmission line conditions, they do not fully eliminate the reflection (sometimes called echo) back to subscriber x, ie., his own communication to subscriber y on line 13' is reflected back on line 12 due to an imperfect line matching impedance associated with summing impedance 122 to be described. In accordance with one aspect of the present invention, any reflected signals back to subscriber x are effectively eliminated by a digitally filtering and a digital subtraction technique implemented under the control of a microcomputer wherein the return signal is continuously subtracted from the sum of the forward and return signals so as to eliminate such undesired reflection signals.

In accordance with another aspect of the present invention, reflection of analog signals in the forward direction from subscriber y due to an imperfect line matching impedance at summing impedance 122 back to subscriber y on two-wire line 10 is prevented by automatically adjusting the effective impedance of the summing impedance 122 which is represented as line matching impedance within 232 as shown in FIG. 3 which is done under microcomputer control.

In accordance with another aspect of the invention, equalization of the amplitude of the various frequency components of the forward analog signal is achieved by a padding by subtraction technique implemented under microcomputer control by digitally filtering in digital filter 106 the forward communication signal to selectively attenuate the frequency components of the forward communication signal to insure that they are all of the same amplitude. Padding is the unequal attenuation of different frequency components of a signal to insure that all frequencies transmitted over telephone lines are of equal power. A more complete description of prior art padding appears in the ITT Reference Data For Radio Engineers, Sixth Edition, 1975, at 11-8 to 11-9.

The two-wire line 10 couples forward analog speech signals to an analog-to-digital converter 104 which performs a digital coding function. The coder 104 may comprise a voltage controlled oscillator for converting the incoming analog signal to nonamplitude sensitive dc outputs. The digitally encoded output is processed by microcomputer 126, within which digital filters 106 and 124 and summation device 110 are implemented. Digital filter 106 processes the coder 104 output with a stored and/or programmable algorithm in accordance with known digital filtering techniques to equalize the frequency components of the digital signal coupled thereto as discussed previously. The output of digital filter 106 on line 108 is derived in accordance with the transfer function H(z) of coder 104 and digital filter 106. This output is summed at a summing device 110, with another signal representative of the negative value of the return signal on line 112, in accordance with the transfer function G(z)H(z) where G(z) corresponds to the analog filter 120, and decoder 118 transfer characteristic. This is implemented by microcomputer 126 which includes a standard microprocessor such as an Intel 8080 augmented with a high speed arithmetic capability for digital filtering, such that the microcomputer 126 and its digital filters 124 and 106 perform all required signal processing. In addition to the foregoing, the microcomputer 126 provides for compensation for subscriber line transmission parameters under program control.

The digital signal on line 108 is corrected by addition thereto of the undesired negative value of the return signal represented by the minus sign—at the input to summing device 110, which is derived from digital filter 124 on line 112, which is coupled to digital filter 124 from line 13'. The forward digital signal is coupled from summing device 110 via line 114 from the line circuit to line 12 and to the switching matrix, such as that disclosed in copending application entitled Continuously Expandable Switching Network of K. Giesken and J. Cotton, Ser. No. 909,583 filed May 25, 1978, continuation of patent application, Ser. No. 776,396 filed Feb. 7, 1977 and assigned to the same assignee as is the instant application.

Since the microcomputer 126 including digital filter 106 is capable of compensating for line loss, the current sensitive equalizer of the prior art may be moved from the telephone subsets to the central office, since a selective frequency attenuation is added into the line circuit under microcomputer control to insure that the total loss will be equal for all transmitted signal frequencies when received at the line circuit, irrespective of the transmission distance from the central office, where the line circuit may, for example, be located. A typical equalizer circuit of the prior art and description thereof appears in *Basic Carrier Telephony*, David Talley, revised second edition, Hayden Book Co., at page 121 thereof.

The programmability of the microprocessor provides the flexibility for program modification for adapting to different transmission characteristics of the subscriber lines 10 and requirements of the line/trunk circuit. The digital return signal from line circuit x via the switching matrix is coupled to microcomputer 126 on line 13' and to a decoder 118 via line 116, which also serves as an internal data bus in the microcomputer. Decoder 118 performs the digital-to-analog conversion of the digital return signal and may comprise any suitable digital-to-analog converter such as the well know weighted resistive network type D/A converter. After final analog filtering by filter 120, the analog speech signal is coupled through analog summing impedance device 122 out onto the two-wire line 10.

Microcomputer 126 includes a memory capacity for program storage accessible as needed by control signals, for example on the data bus 116. A permanent storage of data which may be accomplished by means of a read-only memory incorporated with the microcomputer provides for the storage of programs not readily transferred to the microcomputer from a data line. However, the storage requirement is minimized by the use of the high speed data bus 116, since memory depending upon the degree of line terminating impedance mismatch existing at summer 122, some portion of the return signal is reflected to coder 104, however, this reflection is compensated for as aforedescribed. Since memory associated with each line circuit must exist for all line circuits, hence, any cost savings associated with reduced memory capacity due to external memory access via bus 116 results in a substantial cost savings when considered in the light of a system including a plurality of line circuits when the memory is shared by a plurality of microcomputers. Typically, however, the central storage of non-easily accessible programs could be associated with, for example, a sixty-four subscriber line circuit; hence, one central memory could serve sixty-four two-wire lines, such as line 102, in an actual telephone system implemetation.

Referring now to FIG. 3, a block diagram of certain portions of the subscriber line circuit 100 already described together with additional portions thereof not shown in FIG. 2 is illustrated generally at 200. The key element of FIG. 3 is a programmable signal generator 202 for locally generating the subscriber line circuit ac signalling and dc microphone voltages as required under microcomputer 126 control in response to the detection by microcomputer 126 of received signals on the tip and ring lines 204 and 206. Essentially, incoming analog signals on the tip and ring lines 204 and 206 of the two-wire line 10 are coupled through a suitable conventional overvoltage protection circuit 208 thru a pair of switches S3 and S6 to the aforedescribed A/D coder 104 which senses the instantaneous voltage on the tip and ring lines; digitizes the sensed voltage and couples the digitized sensed voltage to the microcomputer 126 wherein a pulse duration modulated drive control signal is generated having a pulse duration proportional to the magnitude of the sensed analog signal as represented by the digitized voltage. This control signal is coupled to a driver amplifier 210 having an amplified output voltage which is coupled to the programmable signal generator 202 to generate a controlled dc voltage as will be described. In effect, the microcomputer 126 is an efficient means for supplying a voltage control signal to a voltage source to controllably generate an output signal. The instantaneous digitized voltage across the tip and ring lines, representative of modulation and the dc component is transformer coupled to the microcomputer via transformer 234.

The programmable signal generator 202 is electrically isolated from the microcomputer by means of ferrite transformers 228 and 317. The tip and ring lines 204 and 206 are coupled via lines 212 and 214, respectively, from the digital-to-analog decoder 118 and to analog-to-digital coder 104 via lines 220 and 222, providing a four-wire path. A highly efficient feedback control with pulse duration modulation is provided by the digital voltage control output from the microprocessor on line 224, which control output is applied as the base drive to a transistor amplifier 226 in driver 210, the amplifier pulsed output of which is transformer coupled across a small ferrite transformer 228 to the programmable signal generator 202 to generate a dc voltage therefrom. A polarity control signal is provided via lines 230 from the microcomputer and is transformer coupled via transformer 317 to signal generator 202 for use in generating ac signalling voltages from the generated dc voltage, as will be described. A conventional dc isolating impedance 231 is provided.

Line matching impedance 232 described previously with reference to summing impedance 122 in FIG. 2 is shown representatively. Its effective impedance is varied by the programmable signal generator output.

Signalling and other functions heretofore normally requiring separate ac and dc connections to the line circuit, i.e. the dc signal powering the carbon microphone, ringing voltages, test measurements, tone dial pulse coding, etc. can be achieved without a plurality of such separate connections as shown in FIG. 3. Complete remoting of the line/trunk circuit from the switching matrix and modularity thereof on a per line basis is provided thereby resulting in a standard interface to the switching system independent of the type of transmission lines from which signals must be processed.

The aforedescribed microcomputer generated pulse duration modulated control signal on line 224 is preferably in the range of 50 to 100 kHz. It is derived by first sensing the magnitude of the voltage coupled to the A/D coder 104 wherein the incoming analog signal on lines 220 and 222 is converted to a non-amplitude sensitive digital output and transformer coupled vis transformer 234 to the microcomputer. The instantaneous value of this transformer coupled digital signal is then compared with a reference value stored internally in the microcomputer such that any deviation of the compared signal from the reference value serves to generate a signal within the microcomputer to increase or decrease the pulse duration of the signal output from the microcomputer on line 224. Thus, the microcomputer functions as a feedback regulator circuit to vary the pulse duration of the base drive for driver 226. An exemplary means for generating such a pulse duration modulated signal is to count down a preset value stored in a counter associated with the microcomputer. When such stored value reaches zero, the pulse, to be transmitted on line 224, is terminated. The preset value of the counter is controlled by the digital information derived by the microcomputer from the sensed coder 104 output. Other techniques for controlling the preset values stored in such a counter, such as a look-up table stored in the microcomputer memory may also be utilized.

The high frequency operation of the aforedescribed programmable signal generator enables the generation of relatively smooth waveforms and the consequent use of small ferrite-type transformers and small capacitors, thereby avoiding the heavy and bulky battery feed coils and audio transformers of the prior art. An isolated dc-to-dc converter 236 of conventional design may serve as the power supply for decoder 118 and coder 104.

Switches S1 through S7 are used for testing operations. They provide for grounding either/or lines 204 and 206 through S1 and S2, measuring the voltage across impedance 231 by S7, S4 and S3, and disconnecting the line matching impedance represented by 232 through S5 and S6 when line leakage type measurements must be made.

While switches S1 through S7 are illustrated without control inputs thereto from the microcomputer for simplicity of description, it is to be understood that such control inputs are coupled to switches S1 through S7 from microcomputer 126. Switches S1 through S7 may be implemented in like manner as switches 320, 322, 324 and 326 described hereinafter with reference to FIG. 4 and may be opened or closed in accordance with any desired switching sequence being coupled thereto from the control inputs from the microcomputer.

Referring now to FIG. 4, the programmable signal generator 202 is illustrated. The circuit provides a floating isolated bridge for switching the voltage coupled to the secondary winding 302 of ferrite transformer 228. For a given value of Vcc applied to the primary winding 304 of transformer 228 and to drive transistor 226 of driver 210 for the generation of a fixed dc voltage across capacitor 316, the pulse duration of the control signal on line 224 coupled to the base of transistor 226 is constant. Should the load change on the output (tip and ring lines 204 and 206, respectively), the sensing of the voltage change associated with such a load change causes the pulse duration of the base drive to vary correctively, as aforedescribed. This enables the detection of changes in hook status of the subscriber telephone. Further, for ring-trip detection, the average value of the pulse duration (the equivalent dc value) may be compared to an internal reference in the microcomputer to control the generation of a ringing signal. Inductance 312 serves to isolate the relatively low impedance signal generator 202 from the line. Monitoring of gain stability may be accomplished internally in the microprocessor by sensing the line voltages for test purposes.

Operationally, the primary 304 stores energy in accordance with the well known relationship $E=\frac{1}{2}Li^2$. When transistor 226 is ON (the indicated positive polarity dots become negative polarity), diode 314 does not conduct. When transistor 226 is OFF, diode 314 conducts charging shunt capacitor 316 and transferring the energy stored in primary 304 to the secondary 302, i.e. to capacitor 316. Capacitor 316 also serves as a ripple voltage filter. Energy transfer from primary 304 to secondary 302 is controlled by the switching of transistor 226 while the amount of energy transferred, i.e., the effective output voltage across capacitor 316 is controlled by the duty cycle of the switching of transistor 226, which in turn iscontrolled by the pulse duration modulated signal applied to the base thereof from the microcomputer. A regulated energy feedback power supply is thus provided, but at a high enough frequency (100 KHz) to avoid the costly and bulky audio transformers and relays of the prior art.

Bipolar signals for ac signalling are obtained by means of a floating isolated bridge within the programmable signal generator 202 which reverses the polarity of the generated dc voltage at a frequency determined by microcomputer controlled switches. Switches 320, 322, 324 and 326, which may be implemented by VMOS, DMOS, bipolar or other semiconductor switches of known configuration, are driven by isolated, transformer coupled microcomputer controlled switching control pulses under the control of the microcomputer programming and are coupled to switches 320, 322, 324 and 326 from the microcomputer across transformer 317, which is shown on FIG. 3 as representatively coupled to polarity control 230. To generate an ac signal, a halfwave rectified signal and appropriate switching sequence is employed. When switches 320 and 322 are turned ON by control pulses coupled thereto from the microcomputer, switches 324 and 326 are turned OFF and vice versa. Illustratively, when switches 320 and 322 are ON, the negative polarity side of capacitor 316 is coupled to the tip line 204 and the positive polarity side of capacitor 316 is coupled to the ring line 206. Conversely, when switches 324 and 326 are ON, the tip has coupled thereto the positive polarity side of capacitor 316 and the ring has coupled thereto the negative polarity side of capacitor 316. The pulse frequency of these polarity control pulses determine the frequency of the ac signal generated from the dc voltage. The effect is significant, since the heretofore required ac power supply and switches for switching the ac power into the circuit are eliminated. The present circuit can generate all of the subscriber line ac and dc voltages required for tones, signalling, operation and testing.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A line circuit for providing an interface between at least a subscriber line carrying bidirectional analog communication signals and a digital circuit, said line circuit being subject to undesired line signal return from a two-wire to four-wire conversion means provided therein, comprising:
    analog-to-digital coder means for converting said analog communication signals to digital signals;
    digital signal processing means for selectively attenuating said digital signals coupled thereto from said analog-to-digital coder and for subtracting from said attenuated digital signals said undesired line signal return present in said line circuit to provide a composite digital output signal representative of said analog communication signals substantially without the presence therein of said undesired line signal return; and
    means for coupling said composite digital output signal to said digital circuit.

2. A circuit in accordance with claim 1, further comprising:
    digital-to-analog converter means for converting return digital communication signals from said digital circuit to return analog communication signals;
    means for coupling said return digital signals to said signal processing means; and
    summing means for coupling said return analog communications signals from said digital-to-analog converter to said subscriber line.

3. A circuit in accordance with claim 2, wherein said analog communication signals include modulation representative of speech.

4. A circuit in accordance with claim 2, wherein said digital circuit comprises a switching matrix.

5. A circuit in accordance with claim 2, wherein said analog-to-digital converter includes means for deriving pulse code modulated digital signals.

6. A circuit in accordance with claim 2, wherein said subscriber line comprises a two-wire telephone line and wherein said means for selctively attenuating said digital signals includes equalizing means.

7. A circuit in accordance with claim 2, wherein said signal processing means comprises a programmable microcomputer, including:
    means for sensing subscriber line transmission conditions; and
    means for coupling signals representative of said sensed subscriber line transmission conditions to said microcomputer to derive control signals for varying the effective line matching impedance in accordance with said sensed subscriber line conditions.

8. A circuit in accordance with claim 7, wherein said signal processing means further includes:
    first digital filter means for selectively attenuating said digital signals in accordance with the transfer function of said digital signals including said undesired signal return;
    second digital filter means for deriving a negative representation of said undesired signal return in accordance with the transfer function of said return signal thru said filter; and
    means for summing said digital signals and said return signals in accordance with said first and second digital filter means.

9. A circuit in accordance with claim 8, wherein said first digital filter means provides compensation for transmission line parameters under control of said programmable microcomputer.

10. A circuit in accordance with claim 8, wherein said first digital filter means includes means for detecting ac signalling.

11. A circuit in accordance with claim 4, wherein said line circuit is remote from said switching matrix.

12. A circuit in accordance with claim 7, wherein said microcomputer includes a stored program control.

13. A circuit in accordance with claim 7, wherein said subscriber line carrying analog communication signals further carries ac voltages indicative of telephone signalling information.

14. A circuit in accordance with claim 13, further comprising:
    programmable signal generator means responsive to microcomputer generated control signals for deriving said ac voltages indicative of said telephone signalling information and for deriving dc voltages.

15. A circuit in accordance with claim 14, further comprising:
    pulse duration modulated means responsive to said control signals, said control signals being pulse duration modulated signals;
    transformer means for coupling said pulse duration modulated signals to said programmable signal generator; and
    means for varying the output of said programmable signal generator in accordance with said pulse duration modulated control signals coupled thereto.

16. A circuit in accordance with claim 15, wherein one of said signalling voltages generated by said programmable signal generator is a ringing voltage.

17. A circuit in accordance with claim 15, wherein said sensing means includes means for sensing hook status conditions.

18. A circuit in accordance with claim 15, wherein said sensing means includes means for sensing ring-trip conditions.

19. A circuit in accordance with claim 15, wherein said sensing means includes means for sensing dc current changes.

20. A circuit in accordance with claim 17, wherein said sensing means includes means for sensing dial pulsing.

21. In a telephone subscriber line circuit, a programmable signal generator for generating an electrically isolated output voltage comprising:
    means for coupling generated programmably regulated analog voltages to a two-wire line having signals representative of speech modulation thereon;
    analog-to-digital converter means coupled to said line for sensing said analog voltages and for deriving an electrically isolated digital output signal;
    signal processing means responsive to said digital output signal for comparing said digital output signal with a reference signal and for deriving a pulse duration modulated feedback control signal in response to said comparing; and
    regulator means coupled to said two-wire line for controlling said pulse duration modulated feedback control signal to regulate said coupled programmably regulated analog voltages on said two-wire line, said regulator means further including means for generating said analog voltages.

22. In a telephone subscriber circuit in accordance with claim 21, a programmable signal generator for generating an electrically isolated output voltage wherein said analog voltages on said two-wire line include ac signalling voltages.

23. In a telephone subscriber circuit in accordance with claim 21, a programmable signal generator for generating an electrically isolated output voltage wherein said signal processing means comprises a microcomputer.

24. In a telephone subscriber circuit in accordance with claim 23, programmable signal generator for generating an electrically isolated output voltage wherein said regulator means includes:
switching circuit means having a duty cycle controlled by said feedback control signal and having a switched output signal; and
transformer means for transferring energy from the primary thereof to the secondary thereof in response to said switched output signal from said switching circuit such that the amount of energy transferred from said primary to said secondary of said transformer is proportional to the duty cycle of said switching circuit.

25. In a telephone subscriber circuit in accordance with claim 24, further comprising:
means for testing said two-wire line with test voltages generated by said programmable signal generator.

26. In a telephone subscriber circuit in accordance with claim 24, wherein said regulator means further includes:
signal isolation means for isolating the secondary of said transformer from said two-wire line, and wherein said switching circuit is a switching transistor.

27. In a telephone subscriber circuit in accordance with claim 24, wherein said transformer is a ferrite transformer and wherein said isolation means includes a floating bridge circuit.

28. In a telephone subscriber circuit in accordance with claim 27, wherein said floating bridge circuit is comprised of a plurality of switches controlled by said microcomputer for generating an output ac voltage from said regulated analog voltage.

29. A method for interfacing at least a subscriber line carrying bidirectional analog communication signals with a digital circuit through a line circuit said line circuit being subject to undesired line signal return from a two-wire to four-wire conversion means provided therein, comprising the steps of:
converting said analog communication signals to digital signals;
digitally processing said digital signals with a signal processing means by selectively attenuating said digital signals and by subtracting from said attenuated digital signals said undesired line signal return present in said line circuit to provide a composite digital output signal representative of said analog communication signals substantially without the presence therein of said undesired line signal return; and
coupling said composite digital output signal to said digital circuit.

30. A method in accordance with claim 29, further comprising the steps of:
converting return digital signals from said digital circuit to return analog communication signals;
coupling said return digital signals to said processing means; and
coupling said return analog communication signals from said digital-to-analog converter to a said subscriber line thru a summing means.

31. A method in accordance with claim 30, wherein said subscriber line comprises a two-wire telephone line and wherein said selective attenuation and substraction step includes processing said digital signals for providing digital signal isolation for a two-wire to four-wire conversion.

32. A method in accordance with claim 30, wherein said signal processing step includes:
sensing subscriber line transmission conditions; and
varying the selective attenuation of said digital signals in accordance with said sensed subscriber line conditions.

33. A method in accordance with claim 32 wherein said signal processing step further includes:
digitally filtering said digital signals and undesired return signals in accordance with the transfer function of said digital signals and undesired return signals thru said line circuit;
deriving a signal representative of said undesired communication signals in accordance with the transfer function of said signals alone; and
summing said digital signals and undesired return signals in accordance with transfer functions.

34. A method of providing a programmable signal generator for a bidirectional telephone subscriber line circuit comprising the steps of:
coupling generated and programmably regulated analog voltages to a two-wire line;
sensing said analog voltages with an analog to digital converter coupled to said line for deriving an electrically isolated digital output signal;
comparing said digital output signal with a reference signal in a signal processor responsive to said digital output signal for deriving a pulse duration modulated feedback control signal in response to said comparing; and
regulating said programmably regulated analog voltages on said two-wire line with a regulator coupled to said two-wire line for controlling said pulse duration modulated feedback control signal and for generating said analog voltages.

35. A method in accordance with claim 34, wherein said regulating step includes generating an electrically isolated, regulated output voltage in accordance with the following substeps:
switching a solid state circuit having a duty cycle controlled by said feedback control signal and having a switched output signal; and
tranferring energy from the primary of a transformer to the secondary thereof in response to said switched output signal from said switching solid state circuit such that the amount of energy transferred from said primary to said secondary of said transformer is proportional to the duty cycle of said switching circuit.

36. A method in accordance with claim 35 further including the step of:
isolating the secondary of said transformer from said two-wire line.

37. A method in accordance with claim 34 including the further step of testing said two-wire line with test voltages generated by said programmable signal generator.

* * * * *